Aug. 19, 1952   P. H. BISCOE   2,607,226
LIQUID LEVEL GAUGE
Filed March 10, 1948   3 Sheets-Sheet 1
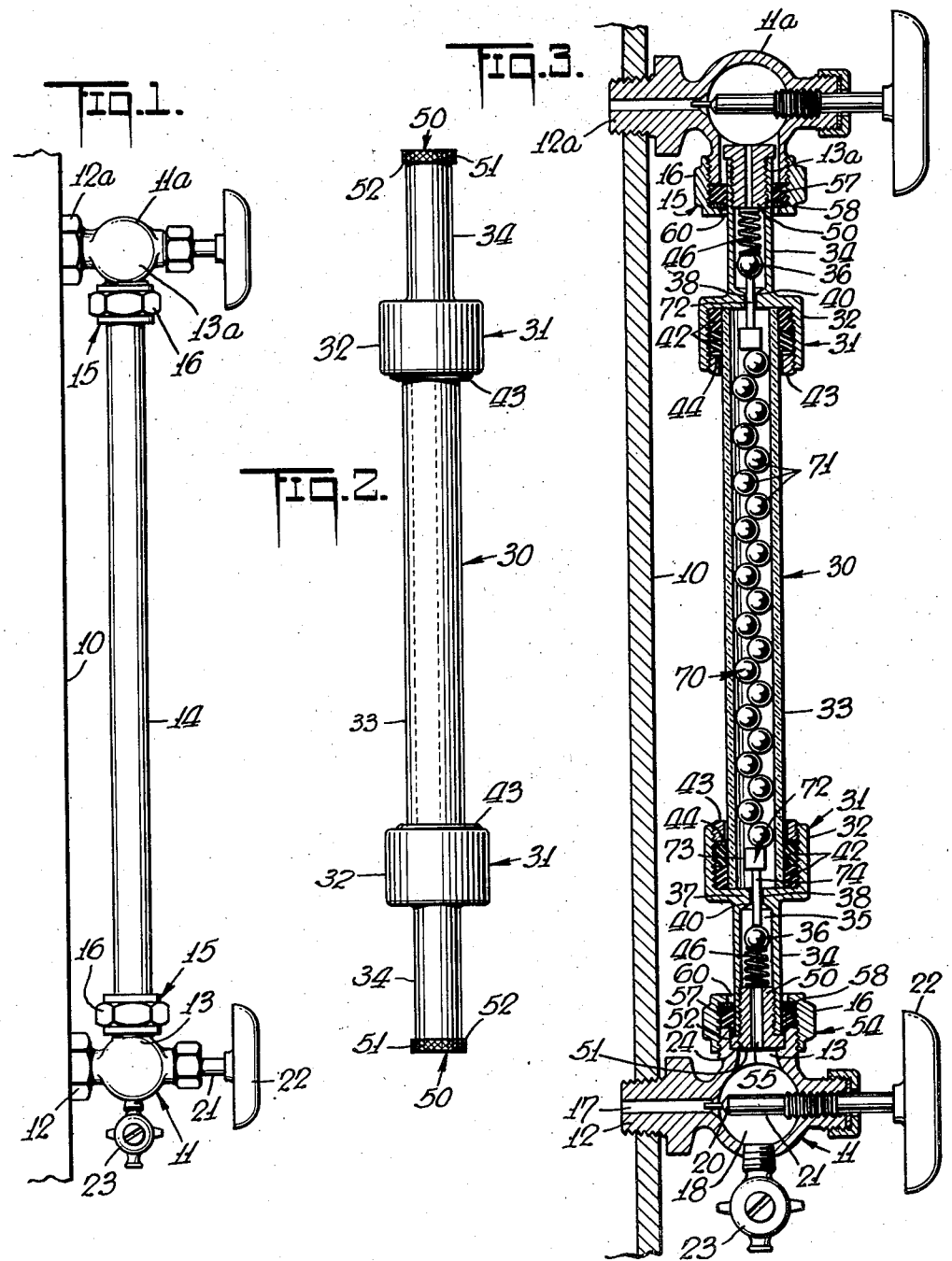
INVENTOR
Percival H. Biscoe
BY
S. Augustus Semmes
ATTORNEY

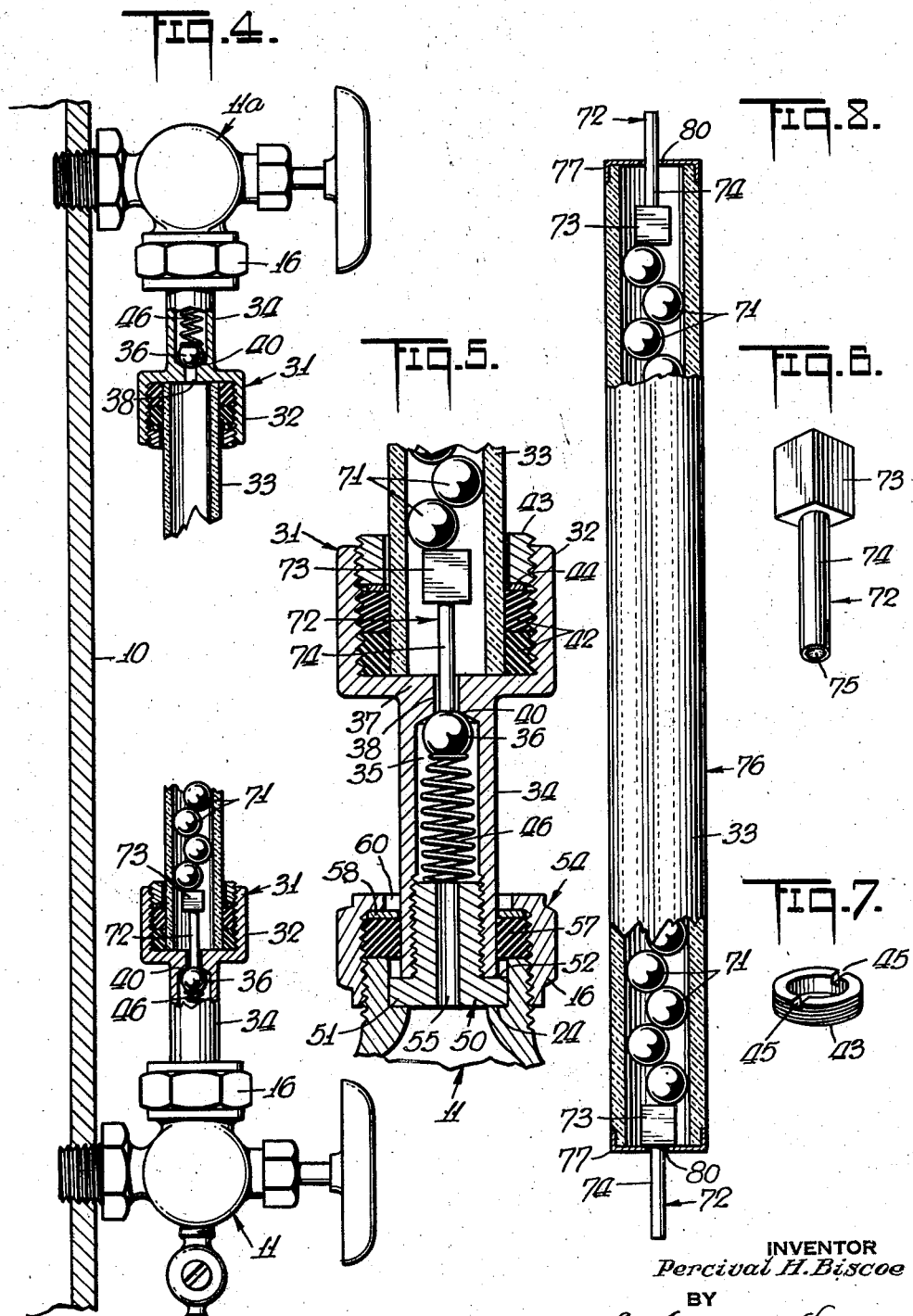

Aug. 19, 1952 P. H. BISCOE 2,607,226
LIQUID LEVEL GAUGE
Filed March 10, 1948 3 Sheets-Sheet 3
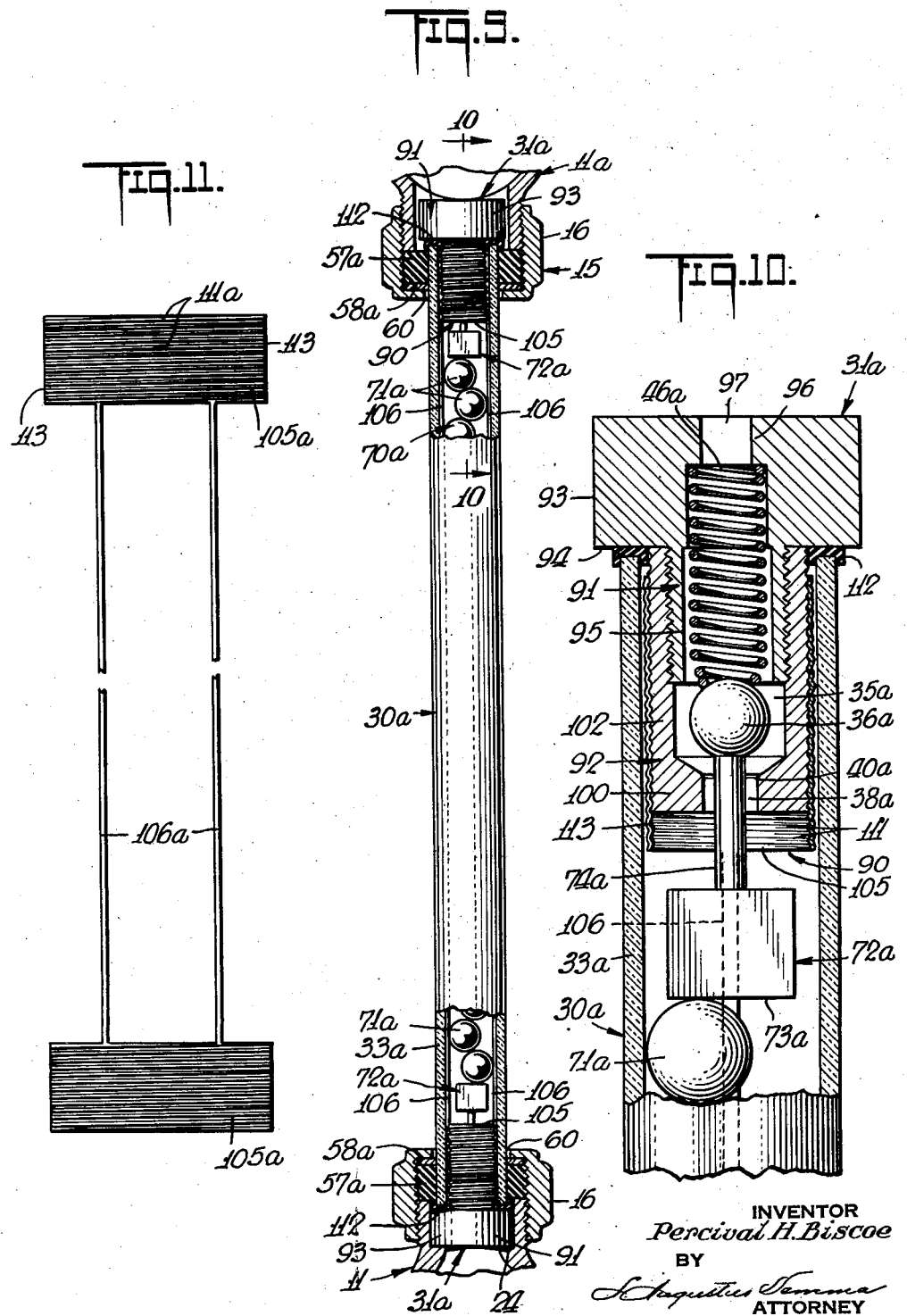
INVENTOR
Percival H. Biscoe
BY
ATTORNEY Patented Aug. 19, 1952

2,607,226

UNITED STATES PATENT OFFICE 2,607,226

LIQUID LEVEL GAUGE

Percival H. Biscoe, Jacksonville, Fla., assignor to Saf-T-Visi Gauge Corporation, a corporation of Florida Application March 10, 1948, Serial No. 14,075

15 Claims. (Cl. 73—333)

The present application is a continuation in part of co-pending application Serial No. 761,487 filed July 17, 1947, and pertains to an invention relating to a liquid level indicator or gauge of the sight tube type employed in connection with pressure vessels such as boilers. The invention relates particularly to liquid level gauges of the safety type operable to close automatically valves at each end of the sight tube when said tube is broken by accident or by internal over-pressure and to check thereby the rush of liquid and/or vapor from the vessel.

One object of the present invention is to provide a new and improved safety liquid gauge of the general type referred to.

Another object is to provide a new and improved safety liquid gauge of the general type referred to, which is positive and reliable in operation, which has valve floating features assuring the proper seating of the movable valve parts in closed position, which has its safety valves designed to remain effectively closed indefinitely upon breakage of the sight tube without the danger of incurring blow-outs of parts of the broken gauge through packing connections even at very high pressures, which is constructed as a self-contained unit easy to install and which can be easily set-up into existing gauge mounting installations simply by the operation of replacing the old gauge by the new one.

In connection with a first embodiment of the invention, another object is to provide a new and improved safety gauge of the general type referred to, which can be easily installed even by inexperienced hands without the danger of breaking the sight tube through the application of excessive tube packing pressure, which lends itself to installation without setting up undue mounting stresses, even though the two pipe fittings into which the gauge is mounted at both ends are not in vertical alignment, which affords sufficient flexibility and/or resiliency in its end mounting to absorb accidental impacts of substantial intensity, without injury to the gauge, and to reduce difficulties arising from vibration and temperature strains and which lends itself to quick and easy inexpensive replacement of its sight tube when broken.

In connection with a second embodiment of the invention, a further object is to provide a new and improved safety gauge of the general type referred to, which requires a minimum of joint packing, and which is so inexpensive to manufacture as to make it economically practical to replace the entire gauge as a unit, including the valve elements, upon breakage of the sight tube.

As general features of the present invention, the sight tube is connected at both ends to valve fittings containing safety valve members desirably in the form of spring loaded ball valves normally maintained off their seats by a column means or member in said tube. This column member is collapsible automatically upon breakage of the tube to cause positive movement of the safety valve members into position against their respective seats by the action of the valve loading springs acting thereon and is free from end attachments to said valve members, whereby said valve members will align themselves into proper seating closing position upon breakage of said tube, without restriction from said column member.

In the first embodiment of the invention, the sight tube with its collapsible column member is prepacked into the safety valve fittings at each end to form a self-contained unit therewith. The assembling is effected at the factory or assembly plant presumably by experienced hands and under factory inspection requirements so that proper packing of the sight tube into the end safety valve fittings when the gauge reaches the installer is assured. Therefore, when installing the gauge in position onto a vessel or boiler, the mounting of the sight tube in the end safety valve fittings does not have to be disturbed and the sight tube is not apt to break by application of packing pressure thereto during installation. All that is necessary to install the gauge is to screw-pack the safety valve fittings into the pipe connections from the vessel or boiler.

In this first embodiment of the invention, the stuffing box connection of the sight tube into the end safety valve fittings and the stuffing box connection of the safety valve fittings to the pipe connections from the vessel or boiler in installed position of the gauge afford sufficient flexibility and/or resiliency to permit askew mounting of the gauge without setting up destructive stresses on said mounting, to absorb effectively intense shocks resulting from accidental impacts on said gauge without injury to said gauge and to take up effectively stresses resulting from vibration or temperature changes.

In the two embodiments of the invention illustrated, the safety valve fittings at both ends of the sight tube are of the same structure and design except that they are in reverse position, so that either fitting may be connected to the bottom pipe connection while the other fitting is connected to the top pipe connection.

A further object of the present invention especially in connection with the first embodiment referred to, is to provide a new and improved easily replaceable self-contained unit for the ruptured and collapsed portion of the safety liquid gauge. In order to achieve this object, there is provided a replacement unit comprising a sight tube and a collapsible column member therein desirably in the form of a stack of balls adapted to maintain normally the safety valves in open position when said tube is connected to the valve fittings at both ends and to permit said valves to close upon the collapse of the column member resulting from breakage of the tube. A pair of valve opening detents in the sight tube at opposite ends of the collapsible column member forms with said tube and with said column member an integrated unit which can be shipped and stored as such and which can be handled as a unit to replace a corresponding broken unit of the gauge.

In the second embodiment of the invention, the safety valve fittings are fastened more simply to the ends of the sight tube by a connector insert having end pieces for separable attachment to said fittings and an intermediate skeleton structure which extends along said tube but which does not interfere with the immediate collapse of the column member in said sight tube upon breakage of said tube or with visual observation of the liquid level therein. These safety valve fittings extend into the ends of the sight tube, and are prevented from separating by the connector insert, so that the sight tube and the valve fittings form a self-contained unit which can be stored, shipped or installed as such. No packing or stuffing box is required between the sight tube and the valve fittings. A stuffing box or packing is required only when installing the gauge in position and only between each valve fitting and the corresponding pipe connection from the boiler or vessel.

Various other objects, features and advantages of the present invention will be apparent from the following particular description and from inspection of the accompanying drawings, in which Fig. 1 is a side elevation of an existing prior art liquid gauge installation shown for the purpose of illustrating the ease with which such liquid gauges can be replaced by the safety liquid gauge of the present invention without changing the existing connections to the pressure vessel or boiler;

Fig. 2 is a side elevation of one form of complete self-contained safety liquid gauge unit embodying the present invention and shown before its installation into the connections of Fig. 1 and in the integrated form it would be shipped from the factory or plant;

Fig. 3 is a vertical section of the intact safety liquid gauge unit of Fig. 2 but on a larger scale and shows said gauge installed in the vessel connections of Fig. 1 and in normal operation with the safety valves open to afford the necessary communication with the interior of the vessel or boiler;

Fig. 4 is a vertical section of the safety liquid gauge similar to that illustrated in Fig. 3 but shows the sight tube of said gauge broken and the safety valves closed to cut off communication with the interior of the vessel or boiler;

Fig. 5 is a detail section of one of the end fitting units shown in Fig. 4 but on a larger scale;

Fig. 6 is a perspective on an enlarged scale of one of the detent pins or plungers employed in connection with one end of the collapsible column member for maintaining the corresponding safety valve open;

Fig. 7 is a perspective of a gland disc forming part of the stuffing box by which either end of the sight tube in the form of the invention shown in Figs. 2-5 is packed and sealed into its corresponding safety valve fitting;

Fig. 8 is a view partly in vertical section and partly in side elevation of a self-contained replacement unit for a broken sight tube and its collapsible column elements for use in connection with the form of invention shown in Figs. 2-5;

Fig. 9 is a view partly in vertical section and partly in side elevation of another form of safety liquid gauge unit embodying the present invention and shown intact in installed position and in normal operation with the safety valves open;

Fig. 10 is a section of the safety liquid gauge unit taken on lines 10—10 of Fig. 9 but on a larger scale; and Fig. 11 is a side elevation of the stamped blank from which the connector insert used in the form of the gauge unit shown in Figs. 9 and 10 is rolled.

Referring to Fig. 1 of the drawings, there is shown a conventional liquid gauge installation for a pressure vessel or boiler 10 whose liquid level is to be measured. The lower connection for this gauge is shown for the purpose of illustration comprising a hand valve 11 having its inlet 12 screwed into the vessel or boiler 10 below its liquid level and its upstanding lateral outlet 13 connected to the lower end of an ordinary transparent sight tube 14 by a stuffing box 15 having the usual external gland or follower 16. This hand valve 11 is shown provided with a horizontal inlet passage 17 (Fig. 3) which communicates at one end with the interior of the vessel or boiler 10 and at its other end with a chamber 18 in said valve and which is maintained normally open to afford free communication between the interior of said vessel and the interior of the sight tube 14 (Fig. 1). This valve inlet passage 17 (Fig. 3) may be closed by a valve member 20 at one end of a horizontal stem 21 threaded into the valve casing and carrying at its other end a hand-wheel 22 outside the valve casing. A pet cock 23 is provided in the hand valve 11 for draw-off purposes.

The lower hand valve 11 is desirably provided with standard seating means for the lower end of the sight tube 14 (Fig. 1). This tube seating means may take the form of a separable hollow cylinder in the valve outlet 13 resting on the valve stem 21 (Fig. 3) or may take the form of an annular shoulder 24 as shown in Fig. 3 extending radially inwardly from the walls of said outlet 13.

The upper connection for the conventional liquid gauge comprises a hand valve 11a (Fig. 1) having its inlet 12a screwed into the vessel or boiler 10 above its liquid level and having its lateral depending outlet 13a connected to the upper end of the sight tube 14 by a stuffing box 15 having a gland or follower 16. This upper hand valve 11a; except for the fact that it has no tube seating means and draw-off pet cock connected thereto, is in all respects similar to the lower hand valve 11.

The safety liquid gauge unit 30 constituting one possible embodiment shown in Figs. 2 to 8 may be made to replace the conventional liquid gauge shown in Fig. 1, by merely taking out the conventional sight tube 14 in the installation of Fig. 1 and replacing it by the safety gauge unit 30 of Fig. 2 as shown in Fig. 3, while employing the old stuffing box glands or followers 16. This safety gauge unit 30 comprises at its lower end a safety valve fitting 31 desirably made of metal such as brass or stainless steel and having an upper cylindrical cup section 32 for receiving the lower end of a transparent sight tube 33 made of glass or the like and a lower tubular cylindrical valve casing section 34 of reduced external diameter defining a valve chamber 35 for a spring loaded safety valve member 36. A transverse wall 37 between the two fitting sections 32 and 34 defines a limiting shoulder for the lower end of the sight tube 33 and is apertured to form a valve passage or port 38 between the valve chamber 35 and the interior of said sight tube. The lower edge of this transverse wall 37 is desirably lapped or otherwise machined to form an annular valve seat 40 of small width to engage the valve member 36 in closed position thereof.

The lower end of the sight tube 33 is packed into the upper cup section 32 of the valve fitting 31 by a stuffing box and for that purpose it is embraced by one or more packing rings 42 (two being shown) of suitable sealing material such as rubber, snugly retained in the hollow of said cup section and compressed by a follower or gland 43 through a metal bearing washer or disc 44. The gland 43 is desirably of the internal or male type to reduce storage and shipping space and to afford maximum of tube exposure. For that purpose, this gland 43 is desirably in the form of a metal disc as shown in Fig. 7 externally threaded and the inside of the cup section 32 of the valve fitting 31 is internally threaded to receive said gland. A pair of diametrically placed radial notches 45 may be provided in the gland 43 to receive a suitable turning tool such as a spanner wrench.

The safety valve member 36 is desirably in the form of a spherical ball and is urged towards closure position against the valve seat 40 by the positive action of a coil spring 46 in the valve chamber 35. This coil spring 46 has its upper section tapered to prevent it from telescoping into its lower section and reduced in pitch to form a substantially horizontal end convolution on which the valve member 36 can firmly rest without being cocked. The lower end of this coil spring 46 bears against a plug 50 threaded into the lower end of the tubular fitting section 34. This plug 50 is provided with a head 51, larger in external diameter than the external diameter of the tubular fitting section 34 to define a radially projecting annular shoulder 52 serving to prevent blow-outs of the gauge remnants through a lower stuffing box connection 54 between said tubular fitting section 34 and the outlet 13 of the hand wheel 11 when the gauge tube 33 is broken, as will be more fully described. The plug 50 has its head 51 desirably knurled to facilitate finger turning thereof and has an axial hole 55 therethrough establishing communication between the chamber 18 of the hand valve 11 and the chamber 35 in the valve casing fitting section 34.

Where the safety liquid gauge unit 30 of the present invention is to be applied to existing vessel connections, such as those shown in Fig. 1, the stuffing box connection 54 between the tubular fitting section 34 and the outlet 13 of the hand valve 11 desirably employs the same gland or follower 16 which was used in the prior connections. However, to adapt the safety gauge unit 30 of the present invention to existing glands of varying size, the packing ring or rings 57 used in connection with the stuffing box connection 54 are of a size to embrace snugly the outside of the valve casing fitting section 34 and to fit snugly in the interior of the gland 16. Since the fitting section 34 passes through the hole 60 of the gland 16 with varying clearance according to the size of the gland available, means are provided to close up this clearance, for the purpose to be made apparent. To that end, a metal adapter washer 58 is employed of a size to embrace snugly the outside of the valve casing fitting section 34 and to reach to the cylindrical wall of the gland 16. This adapter washer 58 is seated on this packing ring 57 and serves not only as a bearing member through which compressive force is transmitted from the gland 16 to said packing ring but also as a stop for the head 51 of the plug 50 to prevent blow-outs of the valve fitting section 34 through the hole 60 in said gland as a result of vessel pressure against said plug head, upon breakage of the gauge tube 33. Therefore, regardless of the size of the existing gland 16, the proper stuffing box connection can be made therewith for the safety gauge of the present invention by using the appropriate size adapter washer 58 and a packing ring 57 of corresponding size.

The packing ring 57 is of suitable sealing material, such as rubber, and two of these for each stuffing box connection 54 may be employed if desired, instead of one as shown.

The upper end of the sight tube 33 is provided with reversely placed safety valve parts similar to those above described at the lower end of said sight tube and similarly connected to the upper hand valve 11a.

To maintain the safety valve members 36 off their respective seats 40 against the action of the springs 46 in intact condition of the safety gauge unit 30, there is provided in the interior of the sight tube 33 between the two valve members 36 a collapsible column means or member 70 desirably comprising a stack of balls 71, smaller in diameter than the internal diameter of said sight tube to afford a fluid passage along the full length of said tube and to assure the collapse of the stack upon breakage of the sight tube. Although, as far as certain aspects of the invention are concerned, these balls 71 may be of any suitable material, they are desirably of metal such as steel of the stainless type.

The safety valve members 36 are crowded off their respective seats 40 by detent means forming part of the column member 70 and comprising a pin or plunger 72 at each end of the stack of balls 71 bearing against the corresponding safety valve member 36. Each of these detent pins or plungers 72 comprises a rectangular head 73 at one end bearing against the end ball 71 and a rod-like shank 74 passing through the open end of the sight tube 33 and bearing at its outer end against the corresponding safety valve member 36. This latter end of the detent shank 74 is desirably hollowed to present a concave seat 75 for the ball valve 36.

The column member 70 including the balls 71 and the detent pins 72 is in floating relationship to the valve members 36. That is, this column member 70 is free or loose from attachments at its ends to the valve members 36. This permits the valve members 36 to self-align themselves into proper seating position, without the confining influence of the column member 70 upon breakage of the sight tube 33.

The safety liquid gauge unit 30 integrated as shown in Fig. 2 is constructed and assembled in a factory or plant and is stored and/or shipped as such. The sight tube 33, with the column of balls 71 therein, is packed and sealed into the safety valve fittings 31 at the factory or assembly plant, so that presumably the packing of said tube has been accomplished by expert hands and has been inspected against possible breakage before being shipped out. The installer, therefore, does not have to disturb the packing of the sight tube 33 in the valve fittings 31 when setting up the gauge unit. As a result, the possibliity of breaking the sight tube 33 by the use of excessive pressure in the screwing of the gland 43 in position is avoided.

In installing the safety gauge unit 30 shown in Fig. 2 in position, the glands 16 are slipped over the valve fitting sections 34 and the necessary packing rings 57 and adapter washers 58 sized in accordance with the size of the glands 16 available are also slipped over said fitting sections on the outer sides of said glands, while the plugs 50 are removed. These plugs 50 are removed before slipping the packing rings 57 and adapter washers 58 over the valve fitting sections 34, since the heads of said plugs are too large to permit these rings and washers to pass thereover. The plugs 50 are then screwed in position in the valve fitting sections 34 and the gauge unit 30 with the glands 16, packing rings 57 and adapter washers 58 thereon are set up in position by inserting the section 34 of the upper valve fitting 31 into the outlet 13a of the upper hand valve 11a, while the gauge unit 30 is slightly tilted, until the section 34 of the lower valve fitting 31 clears the outlet 13 of the lower hand valve 11. The gauge unit 30 is then straightened out into vertical alignment with the outlet 13 of the lower hand valve 11 and said gauge unit lowered to thrust the section 34 of the lower valve fitting 31 into said valve outlet, until the plug 50 in said fitting section rests on the annular valve shoulder 24, or on the cylindrical hollow block if this is used, as previously described. This setting of the gauge unit 30 may then be fixed by screwing the glands 16 in position.

It should be noted that the stuffing box connections of the ends of the gauge tube 33 in the safety valve fittings 31 and the stuffing box connections of said fittings to the hand valve outlets 13 and 13a respectively afford substantial resiliency to permit the gauge unit 30 to be mounted in askew position without setting up destructive stresses when said outlets 13 and 13a are not in vertical axial alignment. Also, by means of this resilient mounting feature of the sight tube 33 and the valve fittings 31, the gauge can withstand substantial accidental lateral impacts without breakage and is not so adversely affected by vibrations or by strains resulting from temperature changes.

In the operation of the gauge unit, the two hand valves 11 and 11a will be open and the safety valve members 36 will be crowded off their respective seats 40 in open position by the column of balls 71, so that flow communication is maintained between the vessel or boiler 10 and the interior of the gauge tube 33. Under these conditions, the liquid from the vessel or boiler 10 will find its own level in the gauge tube 33. The surface of the liquid in the gauge tube 33 will be emphasized by the fact that the balls 71 immersed in said liquid will visibly assume somewhat ellipsoidal shapes as the result of the refractive effect on said immersed balls.

Since the valve seats 40 are intended to cooperate with ball valves 36, they may be of small area, so that they do not lend themselves so readily to adherence and accumulation of dirt thereon. These valve seats 40 are, therefore, not apt to collect sufficient dirt or grease thereon to interfere with the effective closing of the valve when the sight tube 33 is accidentally broken. Moreover, even if dirt or grease should collect on the valve seats 40, the springs 46 will nevertheless push the safety valve balls 36 effectively and positively against said seats into firm closed position. Because of the small area presented by the valve seats 40, the pressure per unit area exerted by the springs 46 against said seats upon breakage of the sight tube 33, will be comparatively high and will, therefore, assure effective closing of the valves.

In case it is desired to clean the safety valves and their associated valve ports, lower hand valve 11 is closed and the pet cock 23 is opened. This permits steam or other fluid from the upper end of the gauge unit 33 to blow the liquid and dirt in the gauge out through the open pet cock 23.

Upon accidental breakage of the sight tube 33, either as a result of an impact therewith or as a result of internal over-pressure, the column of balls 71 will collapse, some of them actually spilling to the floor. With the column of balls 71 collapsed, there will no longer be any compressive force acting on the valve members 36 to maintain them out of contact with their respective valve seats 40. As soon as this valve releasing condition is created, the springs 46 immediately move the valve members 36 into contact with the valve seats 40 in position to close the valve port 38, thereby checking the escape of liquid and fluids through the broken gauge, as shown in Fig. 5. The attendant can, therefore, immediately close the hand valves 11 and 11a without coming in contact with the scalding water or steam, in the case of a boiler, or with the liquid or gases in the case of any kind of a pressure vessel. While the valves 11 and 11a are closed, the broken tube 33 with its column of balls 71 and valve detent pins 72 can be replaced in a manner to be described.

If the pressure in the vessel or boiler 10 is high enough, this pressure acting on the heads 51 of the plugs 50 when the gauge is broken, will force said plugs with attached fittings 31 outwardly in their stuffing box connections 54 from the position shown in Fig. 5, until the shoulders 52 on said plug heads engage the respective packing rings 57. The metal adapter washers 58 prevent the fittings 31 from blowing clear through these packing rings 57, as already described.

The sight tube 33, the column of balls 71 and the valve detent pins 72 are desirably combined to form a self-contained replacement unit 76 as shown in Fig. 8 which may be stored and shipped as such and which can be handled as a unit to replace a broken sight tube and to supply in connection therewith a full complement of balls 71 and the two valve detent pins 72. To retain the column of balls 71 and the detent pins 72 in the sight tube 33, there is provided a cap 77 at each end of the tube, desirably in the form of a metal cup, embracing the corresponding end of the tube and having a hole 80 through which the corresponding detent shank 74 passes. This hole 80 is large enough to afford peripheral clearance with the detent shank 74 and to maintain thereby fluid communication through said hole but is small enough to prevent the detent head 73 from passing through.

In order to interfere as little as possible with the stuffing box connections between the ends of the sight tube 33 and the valve fittings 31, the ends of said tube are desirably provided with respective recesses for receiving the annular flanges of the caps 77 with the outer peripheral surfaces of said flanges flush with the outer periphery of said sight tube 33. The caps 77 are permanently retained in position by any suitable means, as for example, by the use of cement.

In Figs. 9, 10 and 11, there is shown a safety liquid gauge unit 30a constituting another embodiment of the present invention and having the virtue of simplicity and inexpensiveness. In this form of the invention, the end valve fittings 31a desirably made of metal such as brass or stainless steel fit into the corresponding ends of the transparent sight tube 33a and are retained therein against separation by a connector 90 extending in and along said sight tube. Each of these valve fittings 31a comprises two separable cup sections 91 and 92 in reverse telescopic relationship screwed together and defining therebetween a valve chamber 35a for the reception of valve member 36a desirably in the form of a ball loaded by a coil spring 46a. The inner cup section 91 has a head 93 defining an annular axially facing shoulder 94 for the purpose to be described and a tubular extension 95 externally threaded. The end wall 96 of this cup section 91 has a central aperture 97 to afford free fluid communication between the pipe connection to which the gauge unit 30a is to be connected and the valve chamber 35a.

The outer cup section 92 has an end wall 100 apertured to form a valve passage or port 38a between the valve chamber 35a and the interior of the sight tube 33a. The inner annular edge of this wall 100 around the valve passage 38a is desirably lapped or otherwise machined to form an annular valve seat 40a of small width to engage the valve member 36a in closed position thereof.

The outer cup section 92 has a peripheral wall 102 with an internal thread extending for a distance corresponding to the length of the externally threaded tubular portion 95 of the inner cup section 91 and has an external thread extending substantially along the full length of said outer cup section.

The two cup sections 91 and 92 are secured together by screwing the peripheral wall 102 of the outer cup section 92 over the tubular portion 95 of the inner cup section 91 until the edge of said peripheral wall 102 abuts the annular shoulder 94 on the head 93 of said inner cup section 91. These two cup sections 91 and 92 are screwed together after the valve member 36a and the spring 46a acting thereon have been inserted into one of these sections.

The coil spring 46a in the valve chamber 35a abuts at one end the end wall 96 of the cup section 91 and at its other end engages the valve member 36a. This spring 46a is constructed with its end section nearest the valve member 36a tapered to prevent it from telescoping into its other section and reduced in pitch to form an end convolution extending at substantially right angles to the longitudinal axis of said spring and receiving said valve member without cocking it, as in the construction of Figs. 1 to 8.

The valve fittings 31a with the valve elements 36a and 46a contained therein extend into the respective ends of the sight tube 33a with the heads 93 on the outside of said sight tube. These valve fittings 31a are retained in this position against separation by means of the connector 90 comprising a pair of tubular end pieces 105 having means for separable attachment to said fittings 31a and an intermediate skeleton structure 106 extending through the tube 33a in assembled position of the gauge unit 30a. In the specific form shown, these end connector tubular pieces 105 are formed with a series of threads for screw connection to the external threads of the outer cup section 92 and the intermediate skeleton structure 106 constitutes a pair of diametrically opposite slender ties.

The connector 90 is desirably inexpensively constructed from a single thin sheet of metal, cut by a single stamping operation to form a blank having a pair of end rectangular pieces 105a and a pair of intermediate, parallel, narrow tie strips 106a as shown in Fig. 11. At the same time, while the blank is being cut into the form shown in Fig. 11, it is also stamped to form a series of pitched, parallel, rib-like, thread-forming indentations 111a in the rectangular end pieces 105a. The connector blank cut and stamped as shown in Fig. 11 is then circularly rolled, so that the rectangular end pieces 105a form the tubular end connector pieces 105 with their indentations 111a defining fine threads 111 by which the valve fittings 31a may be screwed into said end pieces.

The width of the blank end pieces 105a is such that when the blank is circularly rolled with the opposite edges 113 of each piece in abutment, resulting tubular end pieces 105 will fit snugly in the ends of the sight tube 33a.

The intermediate tie strips 106a are so spaced that when the blank is rolled as described, these strips forming the ties 106 will lie on diametrically opposite sides of the tubular end pieces 105 and will extend along the inside of the sight tube 33a in close proximity to the inner surface of said sight tube.

To prevent injury to the edges of the glass tube by the fitting heads 93, a gasket 112 may be disposed between said heads 93 and said tube edges. These gaskets 112 may be made of rubber or other similar protective or cushioning material and are of channel shape cross-section, to embrace the edge sections of the sight tube 33a.

The sight tube 33a contains a collapsible column member 70a desirably comprising a stack of balls 71a and also end detent pins or plungers 72a forming part of said column member and bearing against the corresponding safety valve member 36a, as in the construction of Figs. 1–8. Each of these detent pins or plungers 72a comprises a head 73a at one end bearing against the end ball 71a and a rod-like shank 74a passing through the valve passage 38a and bearing at its outer end against the corresponding safety valve member 36a. This latter end of the detent shank 74a is hollowed to present a concave seat for the valve member 36a.

The valve passages 38a may be sufficient to guide the detent plungers 72a and prevent them from being cocked. However, it is desirable to provide ample clearance around the portion of the detent shank 74a passing through the valve passage 38a to afford free fluid flow therethrough, so that other means may be necessary to prevent the detent plunger or pin from being cocked or tilted. For that purpose, the detent head 73a may be big enough so that the edges thereof are close to the inner periphery of the sight tube 33a. The detent head 73a will thereby be guided in its axial movement by the walls of the sight tube.

Since the detent head 73a is square in horizontal cross-section, clearance is provided between the flat side faces of said head and the opposite sections of the sight tube walls affording free fluid flow through the sight tube and along said detent head. However, if a greater clearance is required, these side flat detent faces may be recessed.

The form of detent plunger shown in Figs. 9 and 10, by which the walls of the sight tube serve as a guide for said plunger may be also applied to the embodiment of Figs. 1 to 8 instead of depending upon the valve passages 38 to hold the detent pins against tilting or cocking.

In assembling the gauge unit 30a, after the blank shown in Fig. 11 is rolled as described, the resulting connector 90 is inserted into the empty sight tube 33a. This connector 90 is long enough, so that the tubular end pieces 105 reach almost to the very end of the sight tube 33a. The balls 71a and the detents 72a are then inserted into the sight tube 33a and the two valve fittings 31a with their valve elements 36a and 46a therein are screwed into the end pieces 105 of the connector 90. Since the external threads of the fittings 31a are both desirably right handed, the two fittings may be screwed into the connector end pieces 105 by rotating said fittings at the same time and in opposite directions with manipulative facility. As the two fittings 31a are turned in opposite directions in the ends of the sight tube 33a, they screw into the end connector pieces 105 and pull these end pieces against the tensional resistance of the ties 106. At the same time, the detent plungers 72a extending through the valve passages 38a, engage the respective valve members 36a and crowd these members away from their seats 40a in open position against the action of the springs 46a. This turning operation is continued until the heads 93 of the fittings 31a abut the gaskets 112 respectively. In this position, the gauge unit 30a will form a self-contained unit which can be stored, shipped and manipulated for installation as such and which does not contain any joint packing of the stuffing box type such as shown in the embodiment of the invention of Figs. 1 to 8. The only packings in the gauge unit 30a are the gasket rings 112 which serve to protect the edges of the glass sight tube against injury and which are not necessary to form any fluid type joints.

In installing the gauge unit 31a into pipe connections from a pressure vessel or boiler, the fitting 31a at each end is unscrewed from the corresponding end connector piece 105 and the gasket 112 removed to permit the glands 16 and the necessary packing rings 57a and adapter washers 58a to be slipped over the ends of the sight tube. These fittings 31a are then screwed back into position into the end connector pieces 105 and the ends of the gauge unit 30a connected into the valves 11 and 11a as described in the form of the invention shown in Figs. 1 to 8.

The adapter washer 58a serves not only as a bearing member through which compressive force is transmitted from the gland 16 to the packing ring 57a but also as a stop for the fitting head 93 with its annular axially facing shoulder 94 to prevent blowouts of the fitting 31a through the hole 60 of the gland 16 as a result of vessel pressure against said fitting head upon breakage of the gauge tube 33a.

The gauge unit 31a will operate in a manner already made apparent in connection with the form of the invention shown in Figs. 1 to 8. In case the sight tube 33a should be broken, the whole gauge unit 30a can be easily replaced by another complete gauge unit, since the inexpensiveness of said unit is such as to economically warrant such complete replacement.

In connection with all of the forms of the invention shown, it should be noted that one important advantage of using a column of balls in the gauge in the manner described, is that this column will conformably adapt itself to the general curvature of the tube or conduit in which it may be retained and will be effective to maintain the safety check valves at each end normally open while the gauge remains unbroken and to collapse automatically when the sight-tube of said gauge is broken, even though this tube or conduit is not straight. In view of this feature of the column of balls, the sight-tube may, for example, be curved, to conform with the curvature of a drum, vessel or reservoir to which it may be connected, or the fittings connected to said sight-tube may be curved towards the drum or vessel and may partially define conduits retaining parts of this column. With this latter arrangement, for example, the column of balls may be extended almost to the wall of the drum or vessel and the safety check valves may be located at or near said wall.

In the specification and in the claims, the invention has been described as a "liquid level gauge." By "liquid level gauge" is intended any gauge of the sight-tube type which indicates the presence of liquid in a vessel or in a conduit, either by showing the level line of the liquid in said gauge or by merely showing liquid in said gauge through said tube. If the gauge is set-up, as for example, in upright position shown, it would ordinarily indicate the level of the liquid in the vessel to which it is connected. However, the gauge may be used in accordance with certain aspects of the present invention, as a means, for example, to indicate the flow of liquid through a pipe or merely the presence of liquid in such a pipe. For example, a pipe connected to a reservoir or vessel in certain refrigerating systems or the like sometimes has a sight-window to indicate the presence or non-presence of liquid in said pipe. The so-called "liquid level gauge" of the present invention, may be employed in place of such a sight-window to indicate flow through the pipe or presence of liquid in the vessel or reservoir to which said pipe is connected. This may be done by connecting the gauge of the present invention to and in parallel with a section of the pipe, so that part of the liquid flows through said gauge. This gauge may extend substantially horizontally or vertically and would indicate by the presence of liquid therein that liquid is flowing through the pipe. If the sight-tube in this gauge should break, the spring-pressed safety check valves near each end would shut off flow through these valves without interfering with flow through the pipe.

In the specification and claims, the line of balls 71 or 71a in the gauge has been referred to as a column member or as a column of balls. The term "column" is not limited to an upright arrangement of the balls 71 or 71a but is also applicable to an arrangement in which the balls extend generally in any other direction.

While the invention has been described with particular reference to specific embodiments, it is to be understood that it is not to be limited thereto but is to be construed broadly and restricted solely by the scope of the appended claims.

What is claimed is:

1. In a liquid level gauge, a sight tube, a safety valve connected to each end of said sight tube, and forming a self-contained unit therewith, each of said valves including a valve member and a spring acting on said valve member to urge said valve member towards its seat into closed position, and a column of elements in said tube between said valves bearing against said valves and comprising a stack of balls, said column being maintained in operative position against collapse by said sight tube, and being operable in said position to crowd said valves off their seats into open position, said stack being maintained under compression by said springs, said balls being substantially smaller in diameter than the internal diameter of said sight tube, whereby said balls tend to assume staggered relationship in said tube and to be pressed by the compressive action of said springs outwardly against the inner surface of the peripheral wall of said sight tube, said column being collapsed upon breakage of said tube to permit said safety valves to move into closed position.

2. In a liquid level gauge for a vessel, a sight tube, a valve fitting at each end of said tube, valve means in said fitting, said fitting being adapted to be connected at each end to a vessel connection by a stuffing box, and being free from direct screw attachment to said vessel connection, shoulder defining means separate from said valve means, connected to each of said fittings and extending outwardly from the outer wall of said fitting transversely of said wall, said shoulder defining means being adapted to engage an abutment member carried by said stuffing box to prevent said fitting from being blown through said stuffing box by the pressure from the vessel upon breakage of said sight tube, and means for normally maintaining said valve means in open position while said sight tube is intact and operable to release said valve means for closing movement automatically upon breakage of said sight tube.

3. In a liquid level gauge for a vessel, the combination as described in claim 2, in which each of said shoulder defining means comprises a head projecting radially outwardly from the outer periphery of the main body of the fitting at the outer end of said fitting to define an axially facing annular shoulder.

4. In combination, a liquid level gauge for a vessel, a sight tube, a valve fitting at each end of said tube, valve means in each of said fittings for checking flow into said sight tube from the ends thereof, said fitting being adapted to be connected at each end to a vessel connection by a stuffing box, and being free from threads by which said fitting may be screwed directly to a vessel, whereby said fitting is frictionally attached to said vessel connection directly through said stuffing box, shoulder defining means separate from said valve means, connected to each of said fittings and extending outwardly from the outer wall of said fitting transversely of said wall, a rigid washer adapted to form part of each of said stuffing boxes and having a hole large enough to fit over the corresponding gauge end but too small to pass over said shoulder defining means, said washer in mounted position of the gauge being adapted to seat against the end wall of a female gland forming part of said stuffing box to close the opening therein and thereby to prevent the corresponding fitting from being blown through said stuffing box by the pressure from the vessel upon breakage of said sight tube, and means for normally maintaining both of said valve means in open position while said sight tube is intact and operable to release both of said valve means for closing movement automatically upon breakage of said sight tube.

5. In combination, a liquid level gauge for a vessel, comprising a sight tube, a valve fitting at each end of said tube, valve means in each of said fittings for checking flow into said sight tube from the ends thereof, each of said valve fittings having a cup section receiving one end of said sight tube and having a valve casing section enclosing the movable parts of said valve means, a closure threaded onto the outer end of each of said valve casing sections and having a section projecting radially outwardly beyond the periphery of said casing section to form an axially facing shoulder, each of said valve casing sections being adapted to form part of a stuffing box by which each fitting may be connected to a vessel connection, a rigid washer adapted to form part of each of said stuffing boxes and having a hole large enough to fit over said valve casing section but too small to pass over the projecting section of said closure, said washer in mounted position of the gauge being adapted to seat against the end wall of a gland forming part of said stuffing box to close the opening therein and thereby to prevent the corresponding fitting from being blown through its stuffing box by the pressure from the vessel upon breakage of said sight tube, and means for normally maintaining both of said valve means in open position while said sight tube is intact and operable to release both of said valve means for closing movement automatically upon breakage of said sight tube.

6. A safety valve fitting for a liquid gauge tube, comprising means for connecting said fitting to one end of a sight tube, said fitting defining a valve chamber for a valve member, and a valve seat therein for said valve member, and having openings at both ends respectively communicating with said valve chamber, and a head near one end of said fitting projecting radially outwardly from the outer periphery of the main body of the fitting to define an annular facing shoulder by which said fitting is prevented from being blown through a stuffing box connection between the gauge and the pipe connection to a vessel in installed position of the gauge.

7. A safety valve device for connection to one end of a liquid gauge tube, comprising a unitary fitting having at one end a cup section for receiving one end of said tube and at its other end a tubular casing section open at its outer end, said fitting having a transverse wall between its sections apertured to form a valve passageway and to define a seat on its valve casing side, a valve member in said casing section, a coil spring in said casing section urging said valve member towards said seat and an apertured closure for the outer end of said casing sections threaded onto said casing section to form a support for said spring and projecting radially outwardly beyond the outer periphery of said casing section to define an axially facing shoulder.

8. In a safety liquid level gauge, a sight tube, a fitting connector extending in and along said sight tube, and having end pieces and an intermediate skeleton tie structure, a valve fitting extending at least partially into said sight tube at each end and secured to the corresponding end piece of said connector, each of said fittings defining a valve chamber and a valve seat therein and being open at both ends to afford communication with said valve chamber through said fitting ends, a valve member in each of said chambers movable towards and away from its valve seat, a spring in each of said valve chambers pressing the corresponding valve member towards its valve seat into closed position, and column means separate from said sight tube and extending through said sight tube, means for normally maintaining said valve members off their valve seats against the action of said springs while said tube is intact and collapsible automatically upon breakage of said tube to permit said valve members to move into closed position.

9. In a safety liquid level gauge, the combination as described in claim 8, said connector end pieces being in the form of sleeves to which said fittings are secured respectively and said tie structure comprising at least two slender ties joining said sleeves.

10. In a safety liquid level gauge, the combination as described in claim 8, said connector end pieces being in the form of sleeves with thread conformations to which said fittings are screwed respectively and said tie structure comprising at least two slender ties joining said sleeves, each of said fittings having a head at its outer end outside of said sight tube projecting radially outwardly from the outer periphery of said sight tube to define an axially facing shoulder.

11. In a safety liquid level gauge, a sight tube, a fitting connector extending in and along said sight tube and having end sleeves and slender ties joining said sleeves, a valve fitting extending at least partially into said sight tube at each end and screwed into said sleeves respectively, each of said fittings defining a valve chamber and a valve seat therein and having end walls apertured to afford communication with said valve chamber through said walls, a valve member in each of said chambers, a coil spring in each of said chambers urging said valve member towards its seat in closed position, each of said fittings having a head at its outer end outside of said sight tube projecting radially outwardly from the outer periphery of said sight tube to define an axially facing shoulder, and a collapsible column in said sight tube comprising a stack of balls and end detents passing through the apertures in the inner fitting walls respectively and crowding said valve members off their seats against the action of said coil springs, said column being adapted to collapse upon breakage of said sight tube to cause said valve members to move towards their seat into closed position by the action of their coil springs.

12. A safety valve device for connection to one end of a liquid gauge tube, comprising a valve fitting having a pair of reversed cup fitting sections with their peripheral wall parts screwed together to define conjointly a valve chamber, the end walls of said cup sections respectively being apertured, and one of said end walls on its inner side around its aperture defining a valve seat, the other end wall projecting radially outwardly to form a head with an axially facing annular shoulder, the peripheral wall of the outer cup section being externally threaded, a valve member in said chamber, and a coil spring bearing at one end against said other end wall, and urging said valve member towards said valve seat.

13. A self-contained unit which is adapted to replace a broken part of a safety liquid gauge connected to vessel connections and which is separable from said vessel connection, comprising a sight tube, a stack of balls in said tube supported against collapse by said tube and adapted to collapse upon breakage of said tube, a detent pin or plunger at each end of said stack, and apertured closures at opposite ends of said tube retaining said balls in said tube, each of said pins having a head at one end in said tube contacting an end wall and a shank passing through the aperture of the corresponding closure with a loose slide fit and adapted to bear at its outer end against a safety valve member in assembled position of the gauge, said head being too large to pass through the corresponding closure aperture.

14. In combination, a liquid level gauge for a vessel comprising a sight tube, a valve fitting for each end of said sight tube, each defining a valve chamber and a valve seat, a valve member in each of said chambers movable towards and away from its valve seat for controlling flow passage through said fitting and to the interior of said tube, a packed stuffing box connection between one end of each valve fitting and a corresponding end of said sight tube, means supported in operative position by said sight tube for maintaining said valve members normally in open position, said means being rendered inoperative by the breakage of said tube, whereby said valve members are permitted to move into closed position against their respective seats, and a packed stuffing box for connecting the other end of each valve fitting to a vessel connection, said stuffing box connections between said tube and said fittings and said means for maintaining said valve members normally in open position being integrated coaxially into a self-contained unit, and said stuffing boxes for connecting said fittings to vessel connections each comprising a threaded gland coaxial with said tube.

15. In a liquid level gauge, a sight tube, a closure at one end of said sight tube, and a safety valve connected to the other end of said sight tube and forming a self-contained unit therewith, said valve including a valve member and a spring acting on said valve member to urge said valve member towards its seat into closed position, and a column of elements in said tube between said valve and said closure bearing against said valve and said closure and comprising a stack of balls, said column being maintained in operative position against collapse by said sight tube, and being operable in said position to crowd said valve off its seat into open position, said stack being maintained under compression by said spring, said balls being substantially smaller in diameter than the internal diameter of said sight tube, whereby said balls tend to assume staggered relationship in said tube and to be pressed by the compressive action of said spring outwardly against the inner surface of the peripheral wall of said sight tube, said column being collapsed upon breakage of said tube to permit said safety valve to move into closed position.

PERCIVAL H. BISCOE.

REFERENCES CITED

The following references are of record in the file of this patent:

UNITED STATES PATENTS

| Number | Name | Date |
|---|---|---|
| 368,197 | Drummond | Aug. 16, 1887 |
| 531,387 | Ruddy | Dec. 25, 1894 |
| 952,833 | Moore | Mar. 22, 1910 |
| 1,047,863 | Wall | Dec. 17, 1912 |
| 1,839,413 | Sage | Jan. 5, 1932 |

FOREIGN PATENTS

| Number | Country | Date |
|---|---|---|
| 3,581 | Great Britain | Mar. 8, 1888 |
| 8,724 | Great Britain | Apr. 14, 1913 |
| 10,641 | Great Britain | May 7, 1906 |